Sept. 22, 1925.  1,554,739
J. E. LEWIS
METHOD AND APPARATUS FOR MAKING CORRUGATED TUBES
Filed May 24, 1920   2 Sheets-Sheet 1
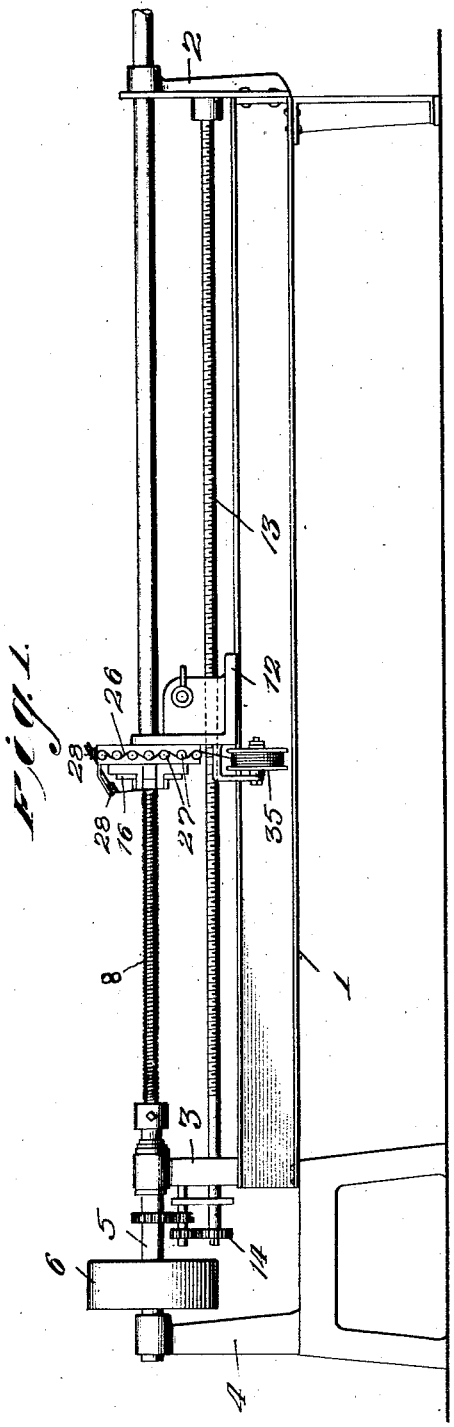
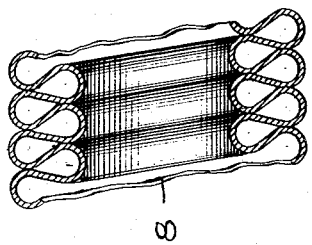
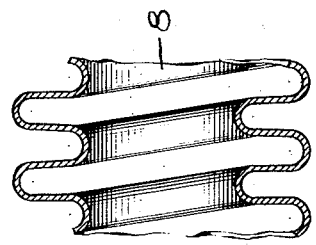
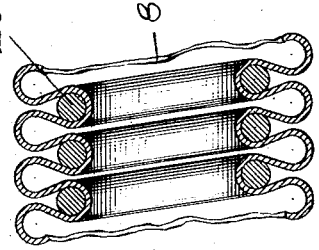
Joseph E. Lewis INVENTOR
BY
Moses, Hammond & Middleton
ATTORNEYS Sept. 22, 1925.  
J. E. LEWIS  
1,554,739  
METHOD AND APPARATUS FOR MAKING CORRUGATED TUBES  
Filed May 24, 1920 2 Sheets-Sheet 2
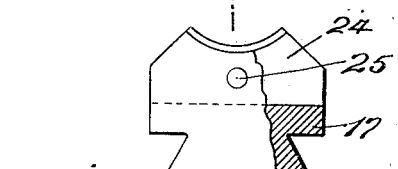
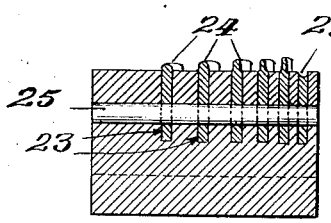
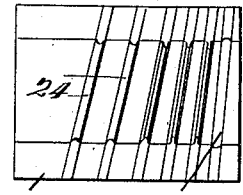
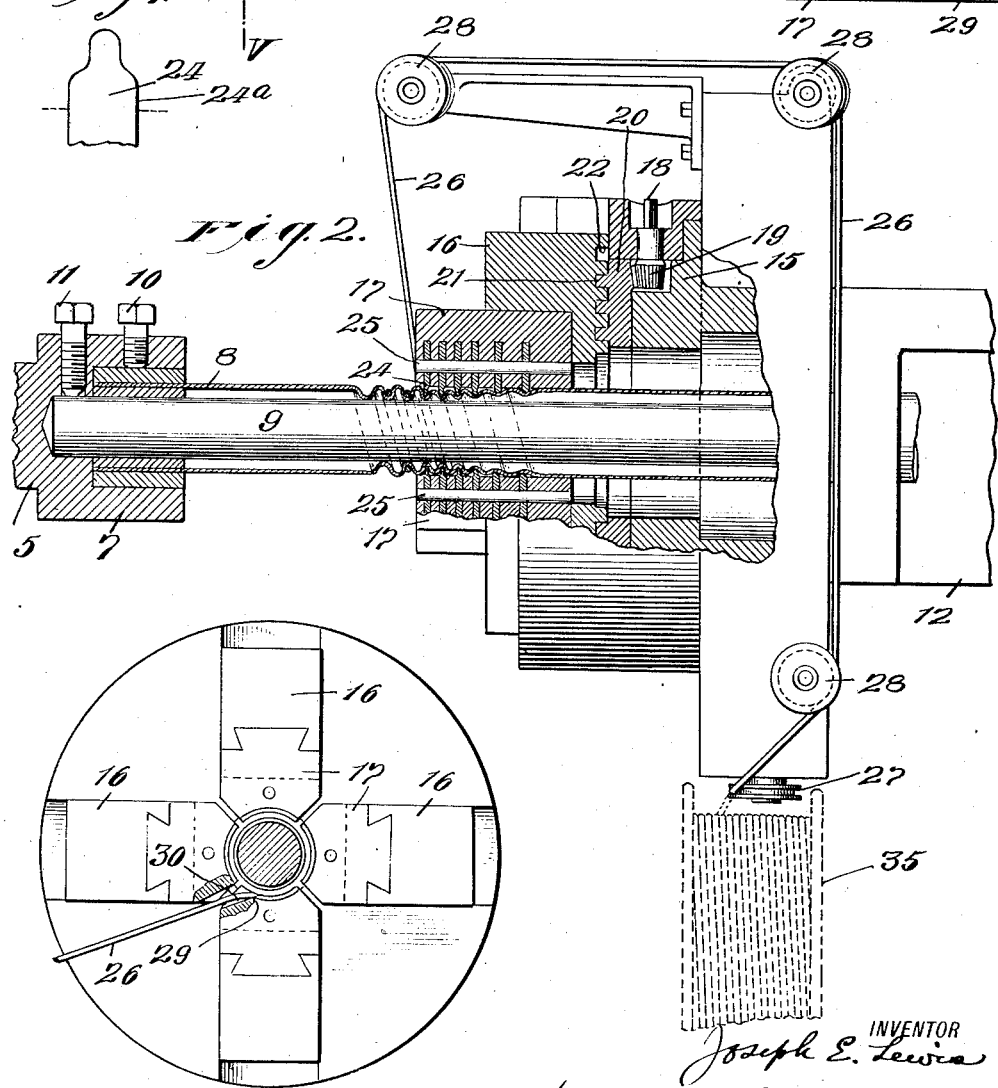
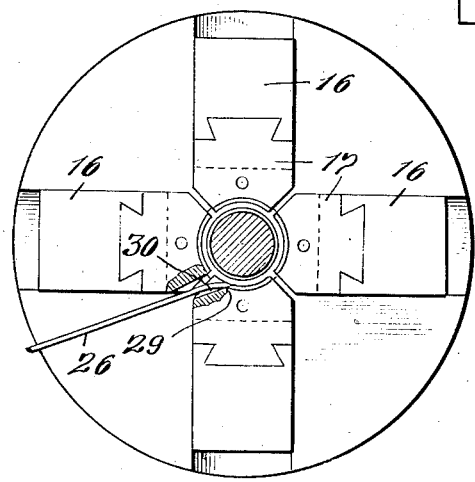

Patented Sept. 22, 1925.

1,554,739

UNITED STATES PATENT OFFICE.

JOSEPH E. LEWIS, OF BALTIMORE, MARYLAND, ASSIGNOR TO UNITED METAL HOSE COMPANY, INC., OF NEW YORK, N. Y., A CORPORATION OF NEW YORK.

METHOD AND APPARATUS FOR MAKING CORRUGATED TUBES.

Application filed May 24, 1920. Serial No. 383,685.

*To all whom it may concern:*

Be it known that I, JOSEPH E. LEWIS, a citizen of the United States, residing in Baltimore, State of Maryland, have invented certain new and useful Improvements in Methods and Apparatus for Making Corrugated Tubes, of which the following is a specification.

My invention relates to improvements in the method and apparatus for making corrugated tubes, and is more particularly adapted to the making of tubes in which the corrugations are of helical form.

The invention has for one of its objects the construction of a tube of this character in such a manner that the corrugations therein will be of uniform size and shape, and uniformly spaced with respect to one another, whereby the tube will be of uniform strength and flexibility throughout its length, thus insuring that the danger of the tube being ruptured when subjected to pressure will be reduced to a minimum. Another object of the invention is to provide for reinforcing or strengthening tubes of this type in an efficient and economical manner, whereby a corrugated tube is produced which, while retaining great flexibility will withstand high internal pressures without deformation or bursting.

The invention also has for its object to provide a machine for constructing tubes of this type in which the corrugation-forming members, are of a novel construction facilitating manufacture, and in which the elements thereof, when they have become worn or broken in use, may be readily removed and replaced by new members, whereby the expense attending the renewal of the corrugating members is reduced to a minimum. Other objects of the invention will appear from the following description and claims.

In its more specific aspects the invention relates to and is an improvement upon the construction of corrugated tubing described in United States Letters Patent to L. H. Brinkman, Nos. 1,120,267, 1,120,268, and 1,120,269, granted December 8 1914.

In the accompanying drawings, which show a preferred embodiment of a machine embodying my invention, by means of which my improved process may be carried out, Figure 1 is a side elevation of a machine showing a tube in the process of being corrugated;

Fig. 2 is an enlarged view, partly in section, of a part of the mechanism, showing the corrugating tool in its operative position;

Fig. 3 is a front elevation of the corrugating tool;

Fig. 4 is a front elevation partly in section of one of the dies of the corrugating tool;

Fig. 5 is a sectional view of the die shown in Fig. 4, taken on the line V—V of Figure 4;

Fig. 6 is a plan view thereof;

Fig. 7 is an enlarged detail view of one of the teeth;

Fig. 8 is a longitudinal sectional view of a portion of a corrugated tube, having the spacing or reinforcing member positioned within the corrugations thereof;

Fig. 9 is a view similar to Fig. 8, showing the form of the tube after the spacing or reinforcing member has been withdrawn; and Fig. 10 is a view showing the form of the tube after the corrugations thereof have been compressed following the withdrawal of the spacing or reinforcing member.

Referring to the drawings, 1 indicates the frame of the machine provided at one end with a tail stock 2, and at its other end with a head stock 3 and a pillow block 4. Journaled within the pillow block 4 and head stock 3 is a shaft 5 to which is secured a pulley 6 adapted to be driven by a belt to effect rotation of the shaft 5. The inner end of the shaft 5 is provided with a chuck 7 within which is secured one end of the tube 8, to be corrugated, and one end of a mandrel 9 which is positioned within the tube 8. The inner ends of the tube and mandrel are secured to the chuck 7, so as to rotate therewith by set screws 10 and 11, and the outer ends thereof are freely supported within the tail stock 2.

Slidably supported upon the frame 1 is a carriage 12, of any suitable construction, which is adapted to be moved longitudinally of the frame 1 by means of a screw 13 having threaded engagement with the carriage 12 and adapted to be rotated by the shaft 5 through suitable gearing 14. Secured to the carriage 12 is a chuck 15, of suitable construction, having mounted thereon, a plurality of radially movable blocks 16 to which dies 17 are removably secured in any suitable manner. The radial movement of the blocks 16 is effected by means of adjusting pins 18 carrying bevel gears 19 which mesh with gear teeth formed on one side of a ring 20, the other side of which is provided with spiral threads 21 engaging similarly formed threads 22 formed in the blocks 16. The inner parts of the dies 17 are provided with transversely extending grooves 23 which are inclined transversely with respect to the longitudinal axes of the dies, and which vary as to their degree of inclination in such a manner that when the dies 17 occupy their operative positions, the grooves 23 of the several dies will form practically a continuous helical groove decreasing in pitch towards the outer or finishing ends of the dies. Detachably secured within the grooves 23 of each of the dies 17, are teeth 24 which are held in place by a pin 25 removably positioned within perforations formed in the die and in the teeth and held in position by frictional engagement therewith, or otherwise. The pin preferably forms a driving fit in the perforations and serves with the grooves to position the teeth accurately within the dies. The portions of the teeth 24 which project outwardly from the grooves 23 increase in height toward the outer or finishing end of the die whereby, when the several dies are in their operative positions, the teeth 24 thereof will form the elements of a helical thread of decreasing pitch and increasing height or depth. The teeth 24 are preferably so formed that the body portions thereof extend slightly beyond the grooves of the die as indicated at 24ª in Figure 7, whereby the root of the projecting portion is strengthened. By providing the dies 17 with removable corrugating members or teeth 24 the latter may be removed when worn and replaced by new teeth at a much less expense than is the case when the teeth are formed as an integral part of the die, as is now the practice, which necessitates the renewal of the entire die when the teeth or any of them become worn or broken in use. Furthermore, as the die may be machined by ordinary methods and as the removable teeth may be formed from flat blanks, they may be more easily and economically manufactured than when the die and its teeth are formed from a block.

Rotatably supported upon the carriage 12 is a reel 35 upon which is wound a roll of wire 26, of a suitable diameter, which constitutes the spacing or reinforcing member for the corrugated tube, as hereinafter described. As the wire is drawn from the reel 35 it passes over a plurality of grooved tensioning rollers 27 or other tensioning means which are carried by the carriage 12. By passing the wire around the tensioning rolls in different ways, the tension on the wire may be regulated as desired to meet varying conditions, as the same amount of tension is not advisable or necessary in all cases. If a medium tension is desired the wire is passed back and forth between adjacent rollers, as shown in Figure 1, in which case the number of bends in the wire is one less than the number of rollers. If a lighter tension is desired the wire is passed around the rollers in such a way that there will be a less number of bends formed therein. This may be accomplished, for example, by passing the wire back and forth between adjacent pairs of rollers. If a heavy tension is necessary the wire is passed back and forth between adjacent rollers, and, in addition, is wound around one or more of the rollers depending upon the degree of tension desired. From the tensioning rollers 27 the wire is led around a plurality of guiding rollers 28 carried by the carriage 12 and so positioned that the wire 26 may be directed or fed into the corrugations formed in the tube 8, upon the completion of the corrugating action of the helical thread formed by the teeth 24. In order to permit of the proper positioning of the wire 26 within the corrugations the outer surface of the outermost tooth 24, is substantially flush with the die, being preferably recessed slightly as indicated at 29, Figure 5, and a portion of the tooth is cut away, as indicated at 30, Figure 3, for the purpose of receiving the wire 26 and directing it into the corrugations formed in the tube 8.

In operation the mandrel 9 and tube 8 are placed in position upon the frame 1 with their inner ends secured within the chuck 7 and their outer ends freely supported within the tail stock 2. The carriage 12 having been positioned adjacent to the chuck 7, the blocks 16 are moved inwardly, by actuating the pins 18 and bevel gears 19, until the dies 17 are brought into their operative positions with respect to the tube 8. Rotation of the shaft 5 is now effected by means of the belt which engages the pulley 6. As the shaft rotates, the mandrel 9 and the inner end of the tube 8, which are secured to the chuck 7, will also be rotated, and simultaneously therewith the endless screw 13 will be rotated to move the carriage 12 from the inner end of the frame 1 toward the outer end thereof. As the carriage 12 thus travels longitudinally of the frame 1 the helical thread, formed by the teeth 24 of the dies 17, will be moved along the tube 8, and as a result thereof the metal will be pressed gradually and progressively inwardly, by the helical thread, to form corrugations. Owing to the friction between the teeth 24 and the tube 8 during the formation of the corrugations, the speed of rotation of the portion of the tube within and beyond the dies 17 is retarded and, as a result, the metal of the tube will be twisted, thus permitting the corrugating of the tube to be effected without rupturing or wrinkling the metal thereof. As the portion of the tube 8 between the headstock 5 and the dies 17 is rotating at a greater speed than the remaining portion of the tube, a further twisting of the corrugated portion of the tube will be effected after the tube leaves the dies which will cause the corrugations or folds to be drawn or folded together, as shown in Figure 8. As the corrugations of the tube leave the dies 17, the wire 26 is introduced therein at the lower portion thereof, thus insuring that the corrugations will be of uniform curvature throughout the length of the tube and equally spaced from one another. The friction between the wire 26, and the corrugations of the tube 8 which are folded closely around the wire by the twisting of the tube, is sufficient to hold the wire in position so that it will wind upon the rotating tube and overcome the tension upon the wire due to the tension rollers 27, thus insuring a proper and even feed of the wire. The wire 26 may be left in position within the corrugations of the tube 8, if desired, in which case it serves to reinforce and strengthen the corrugated tube, as well as to properly space and form the corrugations thereof. If, however, the reinforcing of the tube is not necessary or desirable, the wire 26 may be withdrawn after the corrugating of the tube has been completed. Upon withdrawing the wire from within the corrugations, as shown in Figure 8, the outer portions thereof will be spread apart slightly, as indicated in Figure 9, and the tube may be allowed to remain in this condition, or, if desired, it may be compressed slightly in the direction of its length, in any suitable manner, to cause the outer portions of the corrugations or folds to engage with one another, as shown in Figure 10.

From the above description it will be seen that the corrugated tube, formed in accordance with my invention, will be of uniform flexibility and strength throughout the length thereof, by reason of the fact that the corrugations will be of equal size and shape, and equally spaced with respect to one another, and consequently there will be no danger of the tube being ruptured when subjected to pressure or when flexed as is the case when the corrugations are not uniform as to size, shape and spacing. Furthermore, by providing the tube with a flexible reinforcing member positioned within the inner portions of the corrugations and held against movement with respect to the walls thereof, the strength of the tube is materially increased, without sacrifice of flexibility.

While I have shown and described a preferred embodiment of a machine by means of which the improved form of tube may be manufactured, it is of course understood that the same is shown for illustrative purposes and that the invention is not to be limited thereby. Furthermore, the process may be carried out in any suitable manner and with other apparatus than that shown.

Having thus described my invention, I claim:—

1. The herein-described method which consists in corrugating a seamless tube and inserting spacing means within the corrugations during the formation thereof.

2. The method of forming flexible corrugated tubes, which consists in forming corrugations in a tube and inserting shaping means within said corrugations during the formation thereof.

3. The method of forming flexible corrugated tubes, which consists in forming corrugations in a tube and inserting a wire within said corrugations during the formation thereof.

4. The method of forming flexible corrugated tubes, which consists in forming corrugations in a tube and inserting a wire under tension within the inwardly projecting corrugations.

5. The method of forming flexible corrugated tubes, which consists in forming corrugations in a tube, inserting spacing means within the inwardly projecting corrugations, and causing said corrugations to embrace said spacing means.

6. The method of forming flexible corrugated tubes, which consists in forming corrugations in a tube, inserting a wire within said corrugations, and drawing said corrugations together.

7. The method of forming flexible corrugated tubes, which consists in forming corrugations in a tube, folding said corrugations upon one another, and inserting a wire within said corrugations simultaneously with the folding thereof.

8. The method of forming flexible corrugated tubes, which consists in forming corrugations in a tube, twisting the corrugated portion of the tube to cause said corrugations to be drawn together, and inserting a wire within said corrugations simultaneously with said twisting action.

9. The method of forming flexible corrugated tubes, which consists in forming corrugations in a tube, inserting means within said corrugations to shape and space the same, and then withdrawing said shaping and spacing means after the corrugation of the tube has been effected.

10. The method of forming flexible corrugated tubes, which consists in forming corrugations in a tube, inserting means within said corrugations to shape and space the same, drawing said corrugations together, removing said shaping and spacing means whereby a spreading apart of the outer portions of said corrugations is effected, and finally compressing the tube in the direction of its length to cause the spread-apart outer portions of said corrugations to approach one another.

11. The method of forming flexible corrugated tubes, which consists in rotating a tube, forming corrugations in the tube during the rotation thereof, inserting a wire within the formed corrugations, and twisting the corrugated portion of the tube to draw said corrugations together and into engagement with said wire.

12. The method of forming flexible corrugated tubes, which consists in forming helical corrugations in a tube, inserting a continuous flexible member within said corrugations, and drawing said corrugations together and into engagement with said flexible member.

13. The method of forming flexible corrugated tubes, which consists in forming helical corrugations in a tube and winding a continuous member about said tube and within said corrugations during the formation thereof.

14. In an apparatus of the character described, a die chuck having dies mounted thereon, each of said dies provided with a plurality of grooves, teeth removably positioned within said grooves and extending outwardly therefrom, and means for holding said teeth in position.

15. In an apparatus of the character described, a die provided with a plurality of grooves of varying inclination with respect to the axis of said die, teeth removably positioned within said grooves and extending outwardly therefrom, and means for holding said teeth in position.

16. In an apparatus of the character described, a plurality of dies, each of said dies being provided with a plurality of grooves of varying inclination with respect to the axis thereof, said grooves being so arranged as to form a substantially continuous helical groove of decreasing pitch when said dies occupy their operative positions, teeth removably positioned within said grooves of said several dies and extending outwardly therefrom, and means for retaining said teeth in position.

17. In an apparatus of the character described, means for forming corrugations in a tube, means for effecting relative rotary and bodily movement between said corrugating means and the tube, and a flexible member adapted to be inserted within said corrugations.

18. In an apparatus of the character described, means for forming helical corrugations in a tube, means for effecting relative rotary and bodily movement between said corrugating means and the tube, and a contiuous flexible member adapted to be inserted within said corrugations.

19. In an apparatus of the character described, a supporting member, means carried thereby for forming corrugations in a tube, means for effecting relative rotary and bodily movement between said corrugating means and the tube, flexible means, and means to guide said flexible means into position for inserting the same within said corrugations.

20. In an apparatus of the character described, a supporting member, means carried thereby for forming corrugations in a tube, means for effecting relative rotary and bodily movement between said corrugating means and the tube, a coil of wire, and means carried by said supporting member to guide said wire into position for inserting it within said corrugations.

21. In an apparatus of the character described, a supporting member, means carried thereby for forming corrugations in a tube, means for effecting relative rotary and bodily movement between said corrugating means and the tube, a coil of wire, and means for placing said wire under tension and for guiding it into position for inserting it within said corrugations.

22. In an apparatus of the character described, a supporting member, means carried thereby for forming corrugations in a tube, means for effecting relative rotary and bodily movement between said corrugating means and the tube, a coil of wire, means mounted upon said supporting member and engaged by said wire to tension the same, and guiding means mounted upon said supporting member to guide said wire into position for insertion within said corrugations.

23. In an apparatus of the character described, means for forming corrugations in a tube, means for effecting relative rotary and bodily movement between said corrugating means and the tube, a reel, a wire wound upon said reel and adapted to be inserted within and to be gripped by said corrugations whereby it will be wound about the tube, and unwound from said reel during the corrugating operation, and means for placing said wire under tension as it is unwound from said reel.

24. In an apparatus of the character described, means for forming corrugations in a tube, means for effecting relative rotary and bodily movement between said corrugating means and the tube, a reel, a wire wound upon said reel and adapted to be inserted within and to be gripped by said corrugations whereby it will be wound about the tube, and unwound from said reel during the corrugating operation, and means for placing said wire under varying degrees of tension as it is unwound from said reel.

25. In an apparatus of the character described, means for forming corrugations in a tube, means for effecting relative rotary and bodily movement between said corrugating means and the tube, a reel, a wire wound upon said reel and adapted to be inserted within and to be gripped by said corrugations whereby it will be wound about the tube, and unwound from said reel during the corrugating operation, and a plurality of tension rollers adapted to be engaged by said wire for placing it under tension as it is unwound from said reel.

26. In an apparatus of the character described, means for forming corrugations in a tube, means for effecting relative rotary and bodily movement between said corrugating means and the tube, a reel, a wire wound upon said reel and adapted to be inserted within and to be gripped by said corrugations whereby it will be wound about the tube, and unwound from said reel during the corrugating operation, and a plurality of tension rollers adapted to be engaged in different ways by said wire for placing it under a desired tension as it is unwound from said reel.

27. In an apparatus of the character described, means for forming corrugations in a tube, means for effecting relative rotary and bodily movement between said corrugating means and the tube, a reel, a wire wound upon said reel and adapted to be inserted within said corrugations, said corrugating means exerting pressure upon the tube whereby the corrugated portion of the tube will rotate at a greater speed than the remaining portion thereof to cause the corrugations to be drawn into gripping engagement with the wire to wind it about the tube and to unwind it from said reel, and means for placing said wire under tension as it is unwound from said reel.

28. The method of forming flexible corrugated tubes, which consists in forming corrugations in a tube and inserting a wire under a desired tension within said corrugations.

29. The method of forming flexible corrugated tubes, which consists in forming corrugations in a tube, inserting a wire under tension within said corrugations, and regulating the tension of the wire as required.

JOSEPH E. LEWIS.